May 18, 1926.
J. F. MAYER ET AL
1,585,403
COMBINATION GASKET AND MIXING DEVICE
Filed June 3, 1925
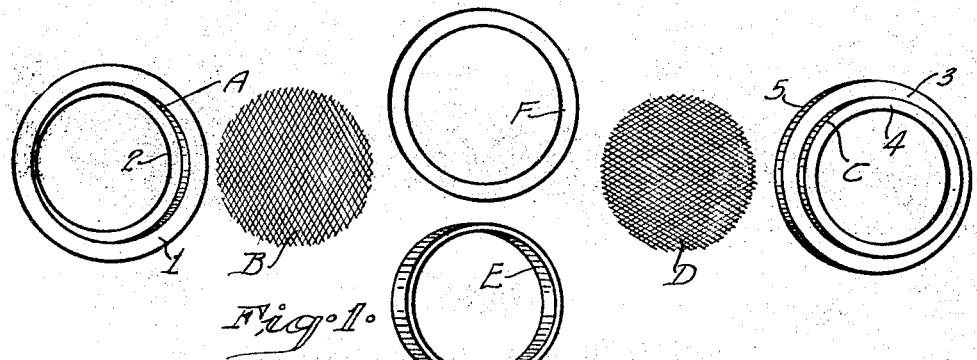
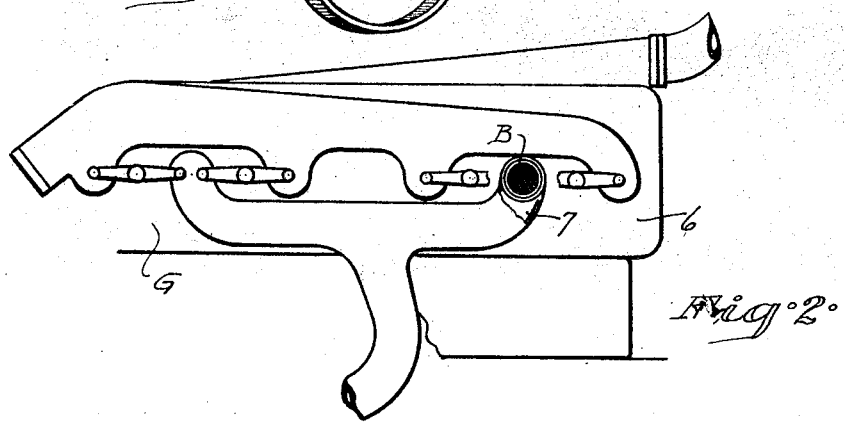
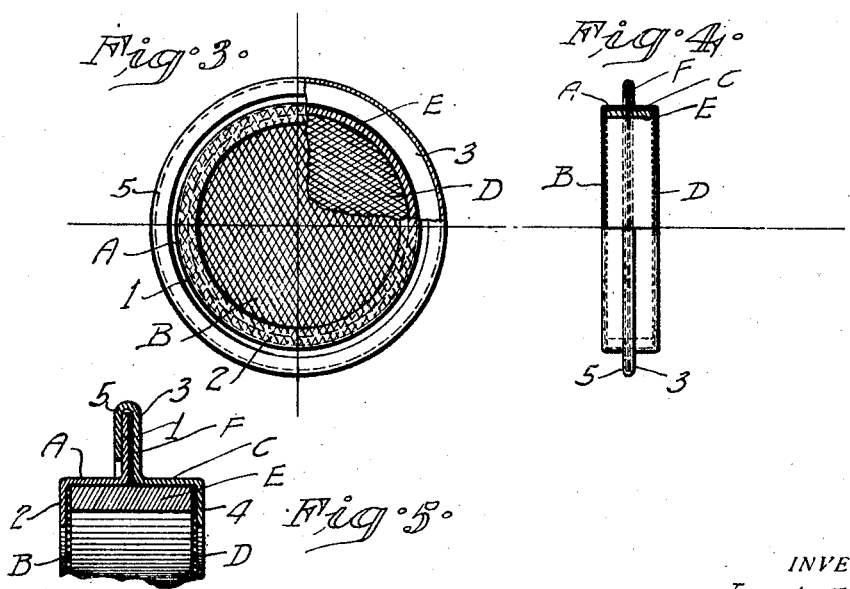
INVENTOR
Joseph F. Mayer
Francis Riemer.
BY
ATTORNEY Patented May 18, 1926.

1,585,403

UNITED STATES PATENT OFFICE.

JOSEPH F. MAYER AND FRANCIS RIEMER, OF ST. LOUIS, MISSOURI.

COMBINATION GASKET AND MIXING DEVICE.

Application filed June 3, 1925. Serial No. 34,647.

This invention relates to a certain new and useful combination gasket and mixing device particularly adapted for use in connection with internal combustion engines.

Our invention has for its chief object the provision, as a unitary structure, of a device adapted to perform, and capable of performing, the functions both of a gasket and so-called mixing device or "gas-saver" in connection with gas-engines of the type stated.

Our invention has for a further object the provision of a device of the kind and for the purposes stated which is simple and compact in form and construction, inexpensive in manufacture, conveniently installed in the engine, and efficient in use.

With the above and other objects in view, our present invention resides in the novel features of form, construction, arrangement, and combination of parts hereinafter described and pointed out in the claims.

In the accompanying drawing, Figure 1 illustrates in plan and perspective the several parts of our new combination gasket and mixing device prior to assemblage into a unitary whole;

Figure 2 illustrates a gas-engine, in outline, equipped with combination gaskets and mixing devices of our invention;

Figure 3 is a plan view, partly broken away and in section, of a combination gasket and mixing device of our invention;

Figure 4 is a view of our combination gasket and mixing device partly in edge elevation and partly in section; and Figure 5 is an enlarged fragmental section of the combination gasket and mixing device.

Referring now more in detail and by reference characters to the drawing, which illustrates a preferred embodiment of our invention, our combination gasket and mixing device includes a tubular member A preferably of thin sheet copper or other suitable material, formed integrally at one peripheral edge with an outwardly presented annular flange 1 and at its other peripheral edge with an inwardly presented annular flange 2, the latter providing an endseat within member A for an end-wall forming disk B having a multiplicity of fine openings or perforations and formed preferably of suitable wire-mesh material.

C designates a companion tubular member similarly formed at one peripheral edge with an outwardly presented annular flange 3 and at its other peripheral edge with an inwardly presented flange 4 likewise providing an end seat within member C for a second end-wall forming perforated preferably wire-mesh disk D, member C being substantially a counterpart of member A with the exception that its outwardly presented flange 3 is, for purposes shortly appearing, diametrically extended, as at 5.

E designates a ring or so-called sleeve of preferably some suitably stiff or rigid metallic material and of a diameter to fit, in the finished device, snugly within the members A and C; and F designates a flat compressible ring of asbestos or other suitable packing material adapted to fit in encircling relation upon ring or collar E preferably midway it peripheral edges.

In assembling said parts or members in the formation of the finished combined gasket and mixing device illustrated in Figures 3 and 4, the disk D is disposed within member C and seated flatwise at its margin upon flange 4. A ring E is then fitted within member C to endwise engage the margin of the disk D seated as stated, upon the seat flange 4. A packing-ring F is now disposed around ring E to rest upon the outwardly projecting or presented flange 3 of member C. The companion member A, with the disk B disposed therein, is the then disposed about the ring E in endwise relation to member C and to rest at its flange 1 upon the packing ring F and its supporting flange 3 of member C, the ring E and the members A and C being of such relative dimensions that, when so assembled, the ring E also engages at its other or opposite end with the disk B and the seat providing flange 2 of member A. The portion 5 of flange 3 of member C is now through a spinning or other suitable operation bent over and clinched upon the flange 1 of member A and the gasket and mixing device completed, the several parts being thus simply but most effectively secured together, the ring F, while wholly concealed, providing a compressible member between the main or body members A and C, and the ring E providing a spacing collar between the disks B and D.

In use and operation, our new gasket and mixing device is preferably disposed upon the engine G, as illustrated in Figure 2, intermediate the cylinder-block 6 and the intake-pipe 7 from the carburetor, not shown, where the device functions, not only as a connecting registration-sleeve between the engine-block 5 and pipe 7, but also as a compressible gasket in preventing leakage between said engine-parts, as a so-called "gas-saver" or mixing device in breaking up any globules of combustible fluid flowing from the carburetor to the engine-cylinders, as well as preventing the entrance into the cylinders of foreign particles that might retard or interfere with proper combustion.

Our device fulfills in every respect the objects stated and from use and practice has been found exceedingly efficient in the performance of its intended functions.

We are aware that changes in the form, construction, arrangement, and combination of the several parts of our combined gasket and mixing device may be made and substituted for those herein shown and described without departing from the nature and principle of our invention.

Having thus described our invention, what we claim and desire to secure by Letters Patent is:

1. A combined gasket and mixing device including a pair of sheet-metal tubular members disposed end to end, outwardly presented engaging annular flanges upon said members at their abutting ends, inwardly presented flanges upon said members at their opposite ends, end walls of mesh-material seated at their margins upon said latter flanges, and a collar disposed within said members intermediate said end walls.

2. A combined gasket and mixing device including a pair of sheet-metal tubular members disposed end to end, outwardly presented engaging annular flanges upon said members at their abutting ends, inwardly presented flanges upon said members at their opposite ends, end-walls of mesh-material seated at their margins upon said latter flanges, a collar disposed within said members intermediate said end walls, and a compressible ring disposed between said outwardly presented flanges.

3. A combined gasket and mixing device including a pair of sheet-metal tubular members disposed end to end, outwardly presented annular flanges upon said members at their abutting ends, inwardly presented flanges upon said members at their opposite ends, end-walls of mesh-material loosely seated at their margins upon said latter flanges, a spacing collar disposed within said members intermediate said end walls, and a compressible ring disposed between said outwardly presented flanges, said last-named flanges having clinching engagement the one with the other.

In testimony whereof, we have signed our names to this specification.

JOSEPH F. MAYER.
FRANCIS RIEMER.